(12) United States Patent
Nakashio et al.

(10) Patent No.: US 10,872,633 B2
(45) Date of Patent: Dec. 22, 2020

(54) MAGNETIC RECORDING MEDIUM, LAMINATE, AND FLEXIBLE DEVICE

(71) Applicant: Sony Corporation, Tokyo (JP)

(72) Inventors: Eiji Nakashio, Miyagi (JP); Yuta Akimoto, Miyagi (JP); Tomoe Sato, Miyagi (JP); Yoichi Kanemaki, Miyagi (JP); Nobuyuki Sasaki, Miyagi (JP); Masaru Terakawa, Miyagi (JP); Kazuya Hashimoto, Miyagi (JP); Katsunori Maeshima, Miyagi (JP); Minoru Yamaga, Miyagi (JP); Hikaru Terui, Miyagi (JP); Hiroyuki Kobayashi, Tochigi (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 16/099,625

(22) PCT Filed: May 11, 2017

(86) PCT No.: PCT/JP2017/017888
§ 371 (c)(1),
(2) Date: Nov. 7, 2018

(87) PCT Pub. No.: WO2017/195866
PCT Pub. Date: Nov. 16, 2017

(65) Prior Publication Data
US 2019/0143637 A1 May 16, 2019

(30) Foreign Application Priority Data
May 11, 2016 (JP) .................. 2016-095334

(51) Int. Cl.
*G11B 5/73* (2006.01)
*G11B 5/735* (2006.01)
(Continued)

(52) U.S. Cl.
CPC .............. *G11B 5/7369* (2019.05); *B32B 7/02* (2013.01); *G11B 5/735* (2013.01); *G11B 5/78* (2013.01); *B32B 2307/734* (2013.01)

(58) Field of Classification Search
None
See application file for complete search history.

(56) References Cited

U.S. PATENT DOCUMENTS 3,808,077 A * 4/1974 Rieser ............... B32B 17/10018
156/102
4,654,284 A * 3/1987 Yu ............................ G03G 5/14
430/531

(Continued)

FOREIGN PATENT DOCUMENTS

| JP | 61-013433 | 1/1986 |
| JP | 09-054935 | 2/1997 |

(Continued)

*Primary Examiner* — Kevin M Bernatz
(74) *Attorney, Agent, or Firm* — K&L Gates LLP

(57) ABSTRACT

A magnetic recording medium according to a first technique includes an elongated substrate having a first surface and a second surface, a first reinforcing layer disposed on the first surface, a second reinforcing layer disposed on the second surface, an adhesion suppressing layer disposed on the second reinforcing layer, and a recording layer disposed on the first reinforcing layer or the adhesion suppressing layer.

20 Claims, 4 Drawing Sheets

(51) Int. Cl.
  *G11B 5/78* (2006.01)
  *B32B 7/02* (2019.01)

(56) References Cited

U.S. PATENT DOCUMENTS

| | | | | |
|---|---|---|---|---|
| 4,770,924 A * | 9/1988 | Takai | ............... | G11B 5/66 427/131 |
| 6,673,477 B2 * | 1/2004 | Yamazaki | ............... | G11B 5/70 428/336 |
| 7,022,396 B1 * | 4/2006 | Kubota | ............... | C08J 5/18 428/141 |
| 7,474,505 B2 * | 1/2009 | Hirai | ............... | G11B 5/7305 360/134 |
| 8,025,993 B2 * | 9/2011 | Hailu | ............... | G11B 5/65 428/831 |
| 2003/0211361 A1 * | 11/2003 | Kim | ............... | G11B 5/7325 428/837 |
| 2005/0153170 A1 * | 7/2005 | Inoue | ............... | G11B 23/107 428/840.1 |
| 2006/0234089 A1 * | 10/2006 | Hintz | ............... | G11B 5/8404 428/831 |
| 2007/0212576 A1 * | 9/2007 | Brodd | ............... | G11B 5/73 428/839 |

FOREIGN PATENT DOCUMENTS

| | | |
|---|---|---|
| JP | 11-339250 | 12/1999 |
| JP | 2000011364 | 1/2000 |
| JP | 2002304720 A | 10/2002 |
| JP | 2002304721 | 10/2002 |
| JP | 2003132525 | 5/2003 |
| JP | 2005071480 | 3/2005 |
| JP | 2007018560 | 1/2007 |

\* cited by examiner

MAGNETIC RECORDING MEDIUM, LAMINATE, AND FLEXIBLE DEVICE

CROSS-REFERENCE TO RELATED APPLICATIONS

The present application claims the benefit of International Application No. PCT/JP2017/017888, filed May 11, 2017, which claims priority to Japanese Application No. 2016-095334, filed May 11, 2016, the contents of which are incorporated herein by reference.

BACKGROUND

The present technology relates to a magnetic recording medium, a laminate, and a flexible device. Specifically, the present technology relates to a magnetic recording medium including a reinforcing layer, a laminate, and a flexible device.

In recent years, the amount of information has explosively increased due to spread of the Internet and big data analysis. It is desired to further increase the capacity of a recording medium for backing up and archiving such information as data. Among various storage systems, merits of a magnetic tape are being recognized once again recently as a low bit cost and green storage. Concerning an increase in density of the magnetic tape, the world record of 148 gigabits per square inch has been established recently, and the increase in density shows no sign of stopping.

In a magnetic tape housed in a cartridge in a state of being wound around a reel, a system such as a linear recording type linear-tape-open (LTO) for performing record and reproduction in a longitudinal direction of the tape using a fixed head in which a large number of magnetoresistive heads is disposed for high capacity has been put into practical use. In order to further increase the capacity, development of a magnetic powder of a coating type magnetic recording layer and development of a recording layer such as a sputtered magnetic layer are actively performed. This makes it possible to narrow a recording bit length and to improve a longitudinal recording density (generally linear recording density) of a tape.

Meanwhile, the magnetic tape uses a flexible film-shaped substrate, and therefore has a very wide recording track width as compared with a magnetic disk. Concerning the increase in density of the magnetic tape, if the track density in a tape width direction can be improved together with development of the above recording layer, the recording density is dramatically improved. In this case, a linear recording density does not change. Therefore, for example, reduction in an output due to a slight spacing between a magnetic recording layer and a head is suppressed. It is considered that development of technology for increasing the track density has a large advantage in development of a tape drive.

When a track density in a tape width direction is increased in a current magnetic tape, the size of the tape itself is changed due to fluctuation in a width direction during traveling of the tape and an environmental factor such as temperature or humidity. As a result, so-called off-track occurs, for example, the track is not present at a track position that should be originally read by a magnetic head, or a shifted track position is read. As the thickness of the tape decreases for higher density, a change in a tape width due to a tension factor further increases. Therefore, an influence of off-track may become significant, and tape traveling performance may become unstable.

Meanwhile, there has been proposed technology of reinforcing a substrate by disposing a reinforcing layer containing a metal, an alloy, or an oxide thereof on one surface or both surfaces of the substrate (for example, see Patent Documents 1 to 6).

CITATION LIST

Patent Document

Patent Document 1: Japanese Patent Application Laid-Open No. 61-13433
Patent Document 2: Japanese Patent Application Laid-Open No. 11-339250
Patent Document 3: Japanese Patent Application Laid-Open No. 2000-11364
Patent Document 4: Japanese Patent Application Laid-Open No. 2002-304720
Patent Document 5: Japanese Patent Application Laid-Open No. 2002-304721
Patent Document 6: Japanese Patent Application Laid-Open No. 2003-132525

SUMMARY

Problems to be Solved by the Invention

In a case where a reinforcing layer is disposed on one surface of a substrate, so-called cupping that the shape of a tape is curved in a width direction occurs. Therefore, a gap is generated between a head and the tape, and this may significantly deteriorate electromagnetic conversion characteristics. In order to suppress such characteristic deterioration, it is studied to dispose reinforcing layers on both surfaces of the substrate. However, in a case where reinforcing layers are disposed on both surfaces of the substrate, when the substrate including the reinforcing layers is wound into a roll in a step of manufacturing a magnetic tape, the reinforcing layers on both surfaces are brought into close contact with each other, and metal adhesion may occur. Such adhesion may occur not only in a case where the reinforcing layers on both surfaces are constituted by the same metal but also in a case where the reinforcing layers are constituted by different types of metals.

Furthermore, even in a flexible device or the like, in a case where reinforcing layers are disposed on both surfaces of a substrate, when the substrate is wound into a roll, the reinforcing layers on both surfaces are brought into close contact with each other, and metal adhesion may occur.

Therefore, an object of the present technology is to provide a laminate capable of suppressing metal adhesion between reinforcing layers disposed on both surfaces of a substrate at the time of winding, a magnetic recording medium including the laminate, and a flexible device including the laminate.

Solutions to Problems

In order to solve the above-described problems, a first technique is a magnetic recording medium including an elongated substrate having a first surface and a second surface, a first reinforcing layer disposed on the first surface, a second reinforcing layer disposed on the second surface, an adhesion suppressing layer disposed on the second reinforcing layer, and a recording layer disposed on the first reinforcing layer or the adhesion suppressing layer.

A second technique is a magnetic recording medium including an elongated substrate having a first surface and a second surface, a first reinforcing layer disposed on the first surface, a second reinforcing layer disposed on the second surface, a carbon thin film disposed on the second reinforcing layer, and a recording layer disposed on the first reinforcing layer or the carbon thin film.

A third technique is a magnetic recording medium including:

an elongated substrate having a first surface and a second surface;
a first reinforcing layer disposed on the first surface;
a first adhesion suppressing layer disposed on the first reinforcing layer;
a recording layer disposed on the first adhesion suppressing layer;
a second reinforcing layer disposed on the second surface; and
a second adhesion suppressing layer disposed on the second reinforcing layer.

A fourth technique is a magnetic recording medium including:

an elongated substrate having a first surface and a second surface;
a first reinforcing layer disposed on the first surface; and
a second reinforcing layer disposed on the second surface, in which
at least one of the first reinforcing layer or the second reinforcing layer is a reinforcing layer containing a metal and oxygen, and
an oxygen concentration on a surface on the opposite side to the substrate out of both surfaces of the reinforcing layer is higher than an oxygen concentration inside the reinforcing layer.

A fifth technique is a laminate including a substrate having a first surface and a second surface, a first reinforcing layer disposed on the first surface, a second reinforcing layer disposed on the second surface, and an adhesion suppressing layer disposed on the second reinforcing layer.

A sixth technique is a laminate including a substrate having a first surface and a second surface, a first reinforcing layer disposed on the first surface, a second reinforcing layer disposed on the second surface, and a carbon thin film disposed on the second reinforcing layer.

A seventh technique is a flexible device including the laminate according to the fifth or sixth technique.

Effects of the Invention

As described above, according to the present technology, it is possible to realize a laminate capable of suppressing metal adhesion between reinforcing layers disposed on both surfaces of a substrate at the time of winding.

DETAILED DESCRIPTION

Embodiments of present technology will be described in the following order.

1 First Embodiment (example of magnetic recording medium)
1.1 Configuration of magnetic recording medium
1.2 Method for manufacturing magnetic recording medium
1.3 Effect
1.4 Modification Example
2 Second embodiment (example of display)
2.1 Configuration of display
2.2 Effect
2.3 Modification Example
3 Third Embodiment (example of magnetic recording medium)
3.1 Configuration of magnetic recording medium
3.2 Effect
3.3 Modification Example 1 First Embodiment

[1.1 Configuration of Magnetic Recording Medium]

Figure 1:
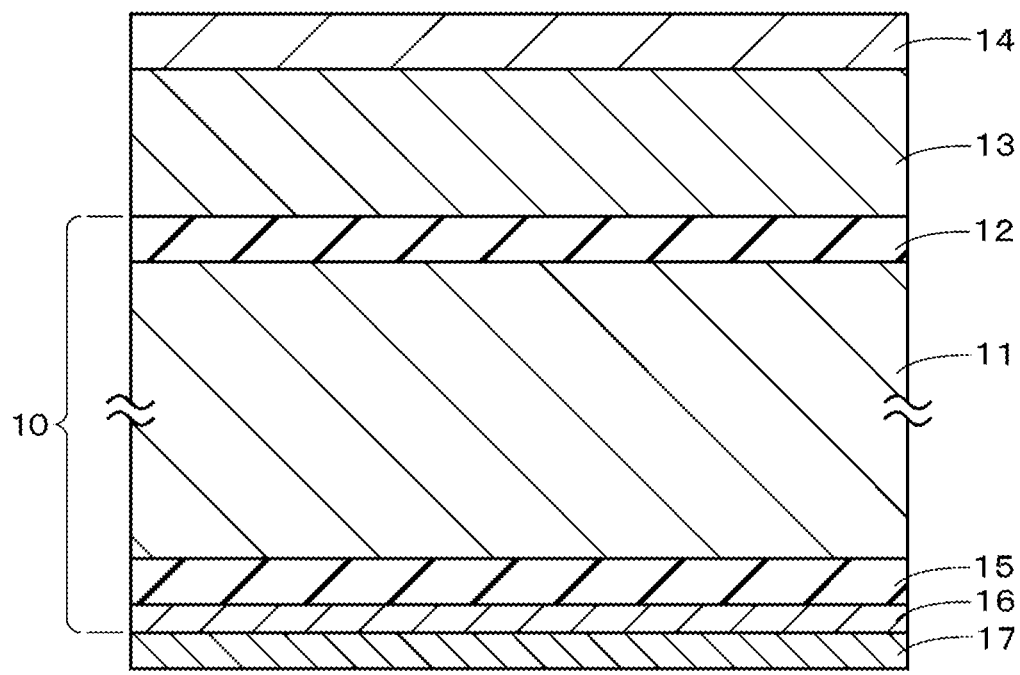
FIG. 1 is a schematic cross-sectional view illustrating an example of a configuration of a magnetic recording medium according to a first embodiment of the present technology.

A magnetic recording medium according to a first embodiment of the present technology is a so-called coating type perpendicular magnetic recording medium, and as illustrated in FIG. 1, includes an elongated substrate 11, a first reinforcing layer 12 disposed on one surface of the substrate 11, a base layer 13 disposed on the first reinforcing layer 12, a recording layer 14 disposed on the base layer 13, a second reinforcing layer 15 disposed on the other surface of the substrate 11, an adhesion suppressing layer 16 disposed on the second reinforcing layer 15, and a back layer 17 disposed on the adhesion suppressing layer 16. Furthermore, the magnetic recording medium may further include a protective layer, a lubricant layer, and the like disposed on the recording layer 14, if necessary. The substrate 11, the first reinforcing layer 12, the second reinforcing layer 15, and the adhesion suppressing layer 16 constitute the laminate 10.

The magnetic recording medium has an elongated shape. The magnetic recording medium preferably has a Young's modulus in a longitudinal direction of 7 GPa or more and 14 GPa or less. When the Young's modulus is 7 GPa or more, a favorable magnetic head contact can be obtained, and edge damage can be suppressed. Meanwhile, when the Young's modulus is 14 GPa or less, a favorable magnetic head contact can be obtained.

The magnetic recording medium preferably has a humidity expansion coefficient of 0 ppm/% RH or more and 4.8 ppm/% RH or less. When the humidity expansion coefficient is within the above range, dimensional stability of the magnetic recording medium can be further improved.

(Substrate)

The substrate 11 is a so-called non-magnetic support, and is specifically a flexible elongated film. The substrate 11 has a thickness of 10 μm or less, for example. The substrate 11 contains, for example, at least one of polyesters, polyolefins, cellulose derivatives, vinyl-based resins, polyimides, polyamides, and polycarbonate. Note that the substrate 11 may have a single layer structure or a laminated structure.

(Base Layer)

The base layer 13 is a nonmagnetic layer containing a nonmagnetic powder and a binder. The base layer 13 may further contain various additives such as conductive particles, a lubricant, an abrasive, a curing agent, and a rust inhibitor, if necessary.

The nonmagnetic powder may be an inorganic substance or an organic substance. Furthermore, carbon black or the like can also be used. Examples of the inorganic substance include a metal, a metal oxide, a metal carbonate, a metal sulfate, a metal nitride, a metal carbide, a metal sulfide, and the like. Examples of the shape of the nonmagnetic powder include various shapes such as an acicular shape, a spherical shape, and a plate shape, but are not limited thereto.

As the binder, a resin having a structure in which a crosslinking reaction is imparted to a polyurethane-based resin, a vinyl chloride-based resin, or the like is preferable. However, the binder is not limited to these resins, and other resins may be blended appropriately according to physical properties and the like required for the magnetic recording medium. Usually, a resin to be blended is not particularly limited as long as being generally used in a coating type magnetic recording medium.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, a synthetic rubber, and the like.

Furthermore, examples of a thermosetting resin or a reactive resin include a phenol resin, an epoxy resin, a urea resin, a melamine resin, an alkyd resin, a silicone resin, a polyamine resin, a urea formaldehyde resin, and the like.

Furthermore, in order to improve dispersibility of a magnetic powder, a polar functional group such as $—SO_3M$, $—OSO_3M$, $—COOM$, or $P=O(OM)_2$ may be introduced into each of the above-described binders. Here, in the formulas, M represents a hydrogen atom or an alkali metal such as lithium, potassium, or sodium.

Moreover, examples of the polar functional group include a side chain type group having a terminal group of $—NR1R2$ or $—NR1R2R3^+X^-$, and a main chain type group of $>NR1R2^+X^-$. Here, in the formulas, R1, R2, and R3 each represent a hydrogen atom or a hydrocarbon group, and $X^-$ represents an ion of a halogen element such as fluorine, chlorine, bromine, or iodine, or an inorganic or organic ion. Furthermore, examples of the polar functional group include $—OH$, $—SH$, $—CN$, an epoxy group, and the like.

Furthermore, a polyisocyanate may be used in combination with a resin to crosslink and harden the polyisocyanate. Examples of the polyisocyanate include toluene diisocyanate and an adduct thereof, alkylene diisocyanate and an adduct thereof, and the like.

As the conductive particles, fine particles mainly containing carbon, for example, carbon black can be used. Examples of the carbon black include Asahi #15, #15HS, and the like manufactured by Asahi Carbon Co., Ltd. Furthermore, hybrid carbon in which carbon is attached to surfaces of silica particles may be used.

As the lubricant, for example, an ester of a monobasic fatty acid having 10 to 24 carbon atoms and any one of monohydric to hexahydric alcohols each having 2 to 12 carbon atoms, a mixed ester thereof, or a di- or tri-fatty acid ester can be used appropriately. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

As the abrasive, for example, α-alumina having an α conversion ratio of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α iron oxide obtained by dehydrating and annealing a raw material of magnetic iron oxide, a product obtained by surface treatment thereof with aluminum and/or silica if necessary, and the like are used singly or in combination thereof.

(Recording Layer)

The recording layer 14 is, for example, a perpendicular recording layer capable of short wavelength recording or ultra-short wavelength super recording. The recording layer 14 is a magnetic layer having magnetic anisotropy in a thickness direction of the recording layer 14. In other words, an easily magnetizable axis of the recording layer 14 is oriented in a thickness direction of the recording layer 14. The recording layer 14 has an average thickness preferably of 30 nm or more and 100 nm or less, more preferably of 50 nm or more and 70 nm or less.

The recording layer 14 is, for example, a magnetic layer containing a magnetic powder and a binder. The recording layer 14 may further contain various additives such as conductive particles, a lubricant, an abrasive, a curing agent, and a rust inhibitor, if necessary.

The magnetic powder is, for example, a hexagonal ferrite magnetic powder or a cubic ferrite magnetic powder. The hexagonal ferrite magnetic powder is constituted by magnetic particles of an iron oxide having hexagonal ferrite as a main phase (hereinafter referred to as "hexagonal ferrite magnetic particles"). The hexagonal ferrite contains, for example, at least one selected from the group consisting of Ba, Sr, Pb, and Ca. The hexagonal ferrite is preferably barium ferrite containing Ba. In addition to Ba, the barium ferrite may further contain at least one selected from the group consisting of Sr, Pb, and Ca.

More specifically, the hexagonal ferrite has an average composition represented by a general formula $MFe_{12}O_{19}$. However, M represents, for example, at least one metal selected from the group consisting of Ba, Sr, Pb, and Ca. M preferably represents Ba. M may be a combination of Ba and at least one metal selected from the group consisting of Sr, Pb, and Ca. In the above general formula, a part of Fe may be replaced with another metal element.

The hexagonal ferrite magnetic particles have an average particle diameter (average plate diameter) preferably of 32 nm or less, more preferably of 15 nm or more and 32 nm or less. The hexagonal ferrite magnetic particles have an average particle thickness preferably of 9 nm or less, more preferably of 7 nm or more and 9 nm or less. The hexagonal ferrite magnetic particles have an average aspect ratio (average particle diameter/average particle thickness) preferably of 3.9 or less, more preferably of 1.9 or more and 3.9 or less.

The cubic ferrite magnetic powder is constituted by magnetic particles of an iron oxide having cubic ferrite as a main phase (hereinafter referred to as "cubic ferrite magnetic particles"). The cubic ferrite contains at least one selected from the group consisting of Co, Ni, Mn, Al, Cu, and Zn. Preferably, the cubic ferrite contains at least Co, and further contains, in addition to Co, at least one selected from the group consisting of Ni, Mn, Al, Cu, and Zn. More specifically, for example, the cubic ferrite has an average composition represented by a general formula $MFe_2O_4$. However, M represents at least one metal selected from the group consisting of Co, Ni, Mn, Al, Cu, and Zn. Preferably, M represents a combination of Co and at least one metal selected from the group consisting of Ni, Mn, Al, Cu, and Zn.

The cubic ferrite magnetic particles have an average plate diameter (average particle size) preferably of 14 nm or less, more preferably of 10 nm or more and 14 nm or less. The cubic ferrite magnetic particles preferably have an average plate ratio (average aspect ratio (average plate diameter $L_{AM}$/average plate thickness $L_{BM}$)) of 0.75 or more and 1.25 or less.

The binder is similar to that in the above-described base layer 13. The conductive particles, the lubricant, and the abrasive are also similar to those of the above-described base layer 13.

As nonmagnetic reinforcing particles, the recording layer 14 may further contain aluminum oxide ($\alpha$, $\beta$, or $\gamma$ alumina), chromium oxide, silicon oxide, diamond, garnet, emery, boron nitride, titanium carbide, silicon carbide, titanium carbide, titanium oxide (rutile type or anatase type titanium oxide), and the like.

(First and Second Reinforcing Layers)

The first and second reinforcing layers 12 and 15 are for enhancing mechanical strength of the magnetic recording medium to obtain excellent dimensional stability. The first and second reinforcing layers 12 and 15 each contain, for example, at least one of a metal and a metal compound. Here, it is defined that the metal includes a semimetal. The metal may be an alloy. The metal is, for example, at least one of aluminum, copper, and cobalt, and preferably copper. This is because copper is inexpensive and has a relatively low vapor pressure, and therefore can form the first and second reinforcing layers 12 and 15 at low cost by a vapor deposition method or the like. The first and second reinforcing layers 12 and 15 may be, for example, a vapor-deposited film formed by a vacuum oblique vapor deposition method or a sputtered film formed by a sputtering method. Note that the materials of the first and second reinforcing layers 12 and 15 may be the same as or different from each other.

Each of the first and second reinforcing layers 12 and 15 preferably has a laminated structure of two or more layers. As the thickness of each of the first and second reinforcing layers 12 and 15 is increased, expansion and contraction of the substrate 11 against an external force can be further suppressed. However, in a case where the first and second reinforcing layers 12 and 15 are formed using a vacuum thin film manufacturing technique such as a vapor deposition method or sputtering, as described above, as the thickness of each of the first and second reinforcing layers 12 and 15 is increased, a gap may be generated more easily in the first and second reinforcing layers 12 and 15. By causing each of the first and second reinforcing layers 12 and 15 to have a laminated structure of two or more layers as described above, when the first and second reinforcing layers 12 and 15 are formed using the vacuum thin film manufacturing technique, a gap generated in the first and second reinforcing layers 12 and 15 can be suppressed, and denseness of the first and second reinforcing layers 12 and 15 can be improved. As a result, water vapor transmittance of each of the first and second reinforcing layers 12 and 15 can be reduced. Therefore, expansion of the substrate 11 can be further suppressed, and dimensional stability of the magnetic recording medium can be further improved. In a case where each of the first and second reinforcing layers 12 and 15 has a laminated structure of two or more layers, materials of the layers may be the same as or different from each other.

Each of the first and second reinforcing layers 12 and 15 preferably has an average thickness of 75 nm or more and 300 nm or less. When the average thickness of each of the first and second reinforcing layers 12 and 15 is 75 nm or more, a favorable function (that is, favorable dimensional stability of the magnetic recording medium) is obtained as the first and second reinforcing layers 12 and 15. Meanwhile, when the average thickness of each of the first and second reinforcing layers 12 and 15 is larger than 300 nm, the thickness of the magnetic recording medium may be large. Furthermore, even if the average thickness of each of the first and second reinforcing layers 12 and 15 is not larger than 300 nm, a sufficient function as the first and second reinforcing layers 12 and 15 is obtained.

The average thickness of each of the first and second reinforcing layers 12 and 15 is determined as follows. First, the magnetic recording medium is cut perpendicularly to a main surface thereof, and a cross section thereof is observed with a transmission electron microscope (TEM). Measurement conditions of TEM are illustrated below.

Apparatus: TEM (H9000NAR, manufactured by Hitachi, Ltd.)
Acceleration voltage: 300 kV
Magnification: 100000 times Next, the average thickness of each of the first and second reinforcing layers 12 and 15 is calculated from the observed TEM image. Specifically, a histogram is made using a SEM/TEM measuring software, Image Measuring Tool manufactured by the General Materials Science and Technology Promotion Foundation, and the average thickness of each of the first and second reinforcing layers 12 and 15 is calculated.

A tensile stress as an internal stress acts on each of the first and second reinforcing layers 12 and 15. Specifically, a stress to deform one surface side of the substrate 11 into a recessed shape acts on the first reinforcing layer 12, and a stress to deform the other surface side of the substrate 11 into a recessed shape acts on the second reinforcing layer 15. As a result, the internal stresses of the first and second reinforcing layers 12 and 15 cancel out each other, and occurrence of cupping in the magnetic recording medium can be suppressed. Here, cupping means curvature generated in a width direction of the elongated substrate 11.

The average thicknesses of the first and second reinforcing layers 12 and 15 may be the same as or different from each other. The average thicknesses of the first and second reinforcing layers 12 and 15 are preferably the same or substantially the same as each other. This is because the internal stresses (tensile stresses) of the first and second reinforcing layers 12 and 15 disposed on both surfaces of the substrate 11 are the same or substantially the same as each other, and occurrence of cupping can be further suppressed.

Here, the phrase that the average thicknesses of the first and second reinforcing layers 12 and 15 are substantially the same as each other means that a difference in average thickness between the first and second reinforcing layers 12 and 15 is within 5 nm.

(Adhesion Suppressing Layer)

The adhesion suppressing layer 16 is for suppressing sticking due to metal adhesion between the first and second reinforcing layers 12 and 15 in a case where the laminate 10 is wound into a roll. The adhesion suppressing layer 16 may be conductive or insulating. A compressive stress (that is, a stress to deform the other surface side of the substrate 11 into a protruding shape) as an internal stress may act on the adhesion suppressing layer 16, or a tensile stress (that is, a stress to deform the other surface side of the substrate 11 into a recessed shape) as an internal stress may act on the adhesion suppressing layer 16. In a case where the tensile stress (internal stress) of the second reinforcing layer 15 is larger than the tensile stress (internal stress) of the first reinforcing layer 12, a compressive stress as an internal stress preferably acts on the adhesion suppressing layer 16. This is because a tensile stress that cannot be canceled out due to the difference in tensile stress between the first and second reinforcing layers 12 and 15 can be canceled out by the compressive stress of the adhesion suppressing layer 16.

The adhesion suppressing layer 16 has an average thickness preferably of 1 nm or more and 100 nm or less, more preferably of 2 nm or more and 25 nm or less, still more preferably of 2 nm or more and 20 nm or less. The average thickness of the adhesion suppressing layer 16 of 1 nm or more can suppress deterioration of a function as the adhesion suppressing layer 16 due to a too small average thickness of the adhesion suppressing layer 16. Meanwhile, the average thickness of the adhesion suppressing layer 16 of 100 nm or less can suppress the average thickness of the adhesion suppressing layer 16 from becoming too large, that is, can suppress the internal stress of the adhesion suppressing layer 16 from becoming too large. The average thickness of the adhesion suppressing layer 16 can be determined in a similar manner to the above-described method for calculating the average thicknesses of the first and second reinforcing layers 12 and 15.

In a case where an average thickness D2 of the second reinforcing layer 15 is 75 nm or more and 300 nm or less, a ratio (D4/D2) of an average thickness D4 of the adhesion suppressing layer 16 to the average thickness D2 of the second reinforcing layer 15 is preferably 0.005 or more and 0.35 or less. The ratio (D4/D2) of 0.005 or more can suppress deterioration of a function as the adhesion suppressing layer 16 due to the too small average thickness D4 of the adhesion suppressing layer 16 with respect to the average thickness D2 of the second reinforcing layer 15. Meanwhile, the ratio (D4/D2) of 0.35 or less can suppress the average thickness D4 of the adhesion suppressing layer 16 with respect to the average thickness D2 of the second reinforcing layer 15 from becoming too large, that is, can suppress the compressive stress of the adhesion suppressing layer 16 with respect to the tensile stress of the second reinforcing layer 15 from becoming too large. As a result, occurrence of cupping can be further suppressed.

The adhesion suppressing layer 16 contains, for example, at least one of carbon and a metal oxide. The adhesion suppressing layer 16 is preferably a carbon thin film mainly containing carbon or a metal oxide film mainly containing a metal oxide. The carbon is preferably diamond-like carbon (hereinafter referred to as "DLC"). The metal oxide preferably contains at least one of aluminum oxide, copper oxide, and cobalt oxide. The adhesion suppressing layer 16 may be, for example, a chemical vapor deposition (CVD) film formed by a CVD method or a sputtered film formed by a sputtering method.

The adhesion suppressing layer 16 preferably has a laminated structure of two or more layers. This is because dimensional stability of the magnetic recording medium can be further improved. Note that the principle thereof is similar to the case where the first and second reinforcing layers 12 and 15 each have a laminated structure of two or more layers. In a case where the adhesion suppressing layer 16 has a laminated structure of two or more layers, materials of the layers may be the same as or different from each other.

(Back Layer)

The back layer 17 contains a binder, inorganic particles, and a lubricant. The back layer 17 may contain various additives such as a curing agent and an antistatic agent, if necessary. The binder, the inorganic particles, and the lubricant are similar to those of the above-described base layer 13.

[1.2 Method for Manufacturing Magnetic Recording Medium]

Next, an example of a method for manufacturing the magnetic recording medium having the above-described configuration will be described.

(Step of Adjusting Coating Material)

First, by kneading and dispersing a nonmagnetic powder, a binder, and the like in a solvent, a base layer-forming coating material is prepared. Next, by kneading and dispersing a magnetic powder, a binder, and the like in a solvent, a recording layer-forming coating material is prepared. Next, by kneading and dispersing a binder, inorganic particles, a lubricant, and the like in a solvent, a back layer-forming coating material is prepared. For example, the following solvents, dispersing apparatuses, and kneading apparatuses can be applied to preparation of the base layer-forming coating material, the recording layer-forming coating material, and the back layer-forming coating material.

Examples of the solvent used for preparing the above-described coating material include ketone-based solvents such as acetone, methyl ethyl ketone, methyl isobutyl ketone, and cyclohexanone, alcohol-based solvents such as methanol, ethanol, and propanol, ester-based solvents such as methyl acetate, ethyl acetate, butyl acetate, propyl acetate, ethyl lactate, and ethylene glycol acetate, ether-based solvents such as diethylene glycol dimethyl ether, 2-ethoxyethanol, tetrahydrofuran, and dioxane, aromatic hydrocarbon-based solvents such as benzene, toluene, and xylene, halogenated hydrocarbon-based solvents such as methylene chloride, ethylene chloride, carbon tetrachloride, chloroform, and chlorobenzene, and the like. These solvents may be used singly, or may be used in a mixture thereof appropriately.

Examples of the kneading apparatus used for preparing the above-described coating material include a continuous twin-screw kneading machine, a continuous twin-screw kneading machine capable of performing dilution in multiple stages, a kneader, a pressure kneader, a roll kneader, and the like, but are not particularly limited to these apparatuses. Furthermore, examples of the dispersing apparatus used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, an ultrasonic wave dispersing machine, and the like, but are not particularly limited to these apparatuses.

(Step of Forming First and Second Reinforcing Layers)

Next, the first reinforcing layer 12 is formed on one surface of the substrate 11 using a roll-to-roll type vacuum film forming apparatus. Next, the second reinforcing layer 15 is formed on the other surface of the substrate 11 using a roll-to-roll type vacuum film forming apparatus. The average thickness of each of the first and second reinforcing layers 12 and 15 can be adjusted by changing film forming conditions such as a winding speed of the substrate 11, a flow rate of an introduced gas, and a discharge voltage. Examples of a vacuum film forming apparatus for forming the first and second reinforcing layers 12 and 15 include a vapor deposition apparatus (for example, oblique vapor deposition apparatus), a sputtering apparatus, a CVD apparatus, and the like.

(Step of Forming Adhesion Suppressing Layer)

Next, the adhesion suppressing layer 16 is formed on the second reinforcing layer 15 using a roll-to-roll type vacuum film forming apparatus. The average thickness of the adhesion suppressing layer 16 can be adjusted by changing film forming conditions such as a winding speed of the substrate 11, a flow rate of an introduced gas, and a discharge voltage. Examples of a vacuum film forming apparatus for forming the adhesion suppressing layer 16 include a vapor deposition apparatus, a sputtering apparatus, a CVD apparatus, and the like. In this way, the laminate 10 is obtained.

(Step of Forming Base Layer)

Next, by applying a base layer-forming coating material onto the first reinforcing layer 12 and drying the base layer-forming coating material, the base layer 13 is formed on the first reinforcing layer 12.

(Step of Forming Recording Layer)

Next, by applying a recording layer-forming coating material onto the base layer 13 and drying the recording layer-forming coating material, the recording layer 14 is formed on the base layer 13. Note that by causing magnetic field orientation of a magnetic powder contained in the coating material during drying, if necessary, an easily magnetizable axis of the magnetic powder may be oriented in a thickness direction of the recording layer 14.

(Step of Heat Treatment)

Next, if necessary, the substrate 11 on which the above layers are laminated may be subjected to a heat treatment to thermally shrink the substrate 11. By thermally shrink the substrate 11 in this way, cupping can be further suppressed. A temperature for the heat treatment is, for example, 80° C. or higher and 120° C. or lower. Retention time of the heat treatment is, for example, 3 hours or more and 72 hours or less.

(Step of Forming Back Layer)

Next, by applying a back layer-forming coating material onto the adhesion suppressing layer 16 and drying the back layer-forming coating material, the back layer 17 is formed. As a result, a wide magnetic recording medium is obtained. Note that in a case where the adhesion suppressing layer 16 is a carbon thin film, after the step of forming the recording layer 14 (or after the step of heat treatment) and before the step of forming the back layer 17, wettability of a surface of the adhesion suppressing layer 16 is preferably improved by a surface modification treatment. This is because coatability of the back layer-forming coating material with respect to the carbon thin film can be improved. Examples of the surface modification treatment include a corona discharge treatment, a plasma treatment, a UV ozone treatment, an electron beam treatment, and the like (Step of Calendering Treatment and Cutting)

Next, the obtained wide magnetic recording medium is rewound around a large-diameter core and cured. Next, the wide magnetic recording medium is calendered and then cut into a predetermined width. As a result, a target magnetic recording medium is obtained. Note that the step of forming the back layer 17 may be performed after the calendering treatment.

[1.3 Effect]

The magnetic recording medium according to the first embodiment of present technology includes the first reinforcing layer 12 disposed on one surface of the substrate 11, the second reinforcing layer 15 disposed on the other surface of the substrate 11, and the adhesion suppressing layer 16 disposed on the second reinforcing layer 15. As a result, internal stresses (tensile stresses) in the first and second reinforcing layers 12 and 15 cancel out each other, and occurrence of cupping in the magnetic recording medium can be suppressed. As a result, it is possible to provide a high SN magnetic recording medium with excellent off-track characteristics, capable of keeping a contact state between a magnetic head and the magnetic recording medium in a favorable state and having high dimensional stability in a track width direction. Furthermore, in a step of manufacturing the magnetic recording medium, when the laminate 10 is wound into a roll, the adhesion suppressing layer 16 is interposed between the first and second reinforcing layers 12 and 15. Therefore, metal adhesion between the first and second reinforcing layers 12 and 15 can be suppressed.

[1.4 Modification Example]

Figure 2:
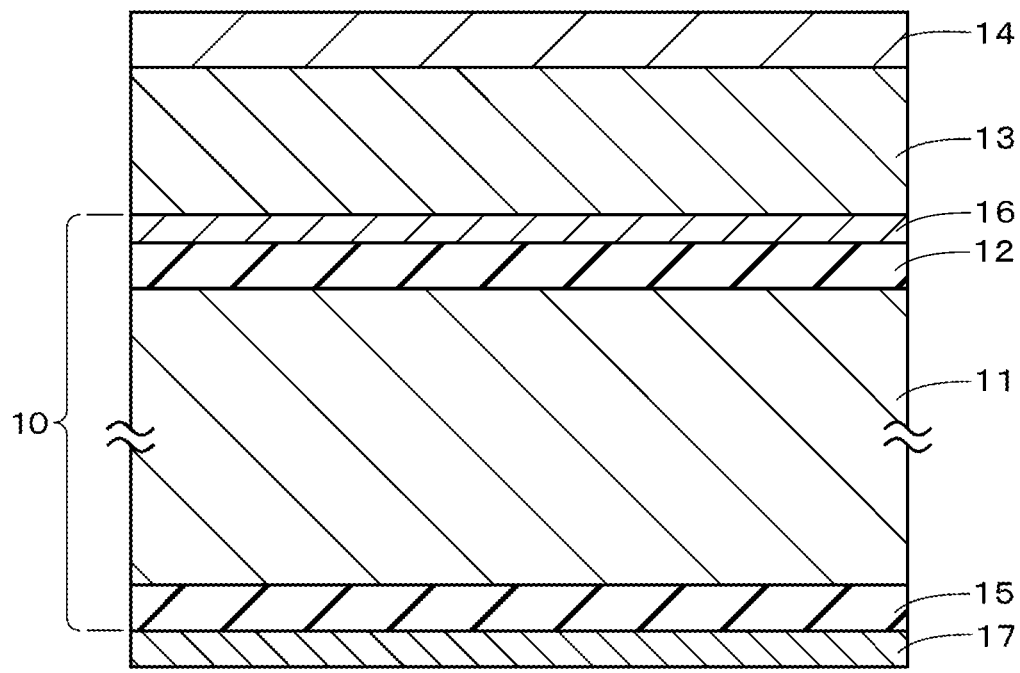
FIG. 2 is a schematic cross-sectional view illustrating an example of a configuration of a magnetic recording medium according to a modification example of the first embodiment of the present technology.

Instead of including the adhesion suppressing layer 16 on the second reinforcing layer 15, the magnetic recording medium may include the adhesion suppressing layer 16 on the first reinforcing layer 12 as illustrated in FIG. 2. In this case, in a case where the adhesion suppressing layer 16 is a carbon thin film, wettability of a surface of the adhesion suppressing layer 16 is preferably improved by a surface modification treatment. This is because coatability of the base layer-forming coating material with respect to the carbon thin film can be improved.

Figure 5:
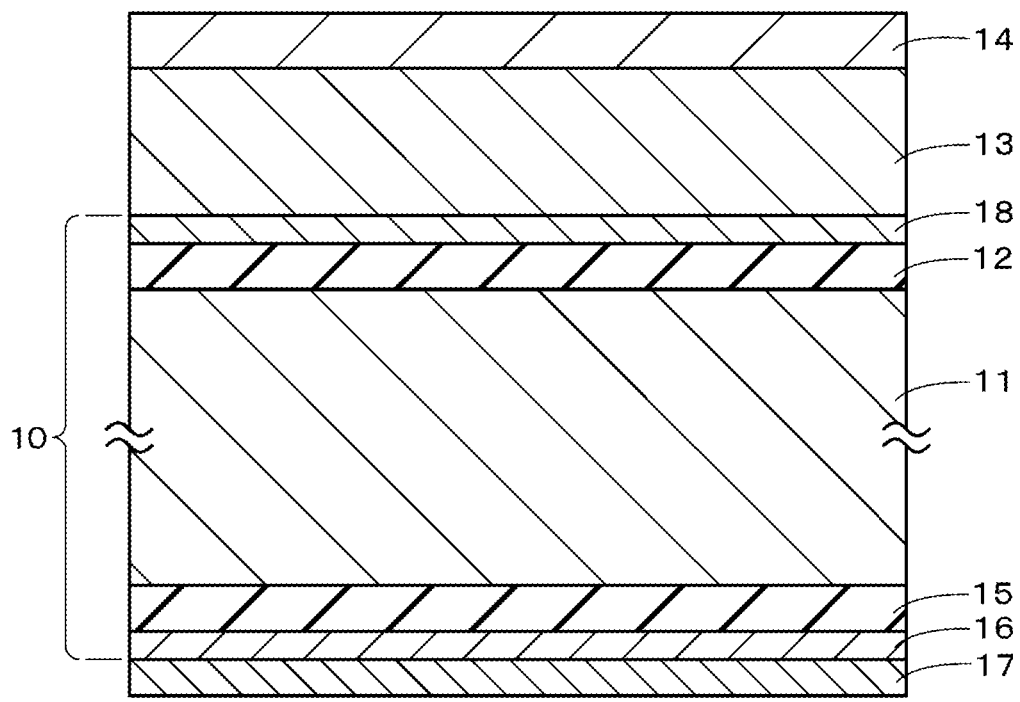
FIG. 5 is a schematic cross-sectional view illustrating an example of a configuration of a magnetic recording medium according to a modification example of the first embodiment of the present technology.

As illustrated in FIG. 5, the magnetic recording medium may further include an adhesion suppressing layer 18 on the first reinforcing layer 12. The adhesion suppressing layer 18 has a similar configuration to the adhesion suppressing layer 16 in the first embodiment. In this case, similar laminated structures (a laminated structure of the first reinforcing layer 12 and the adhesion suppressing layer 18 and a laminated structure of the second reinforcing layer 15 and the adhesion suppressing layer 16) are disposed on both surfaces of the substrate 11. Therefore, cupping can be further suppressed. As a result, the magnetic recording medium can be further stabilized and be smoother. Furthermore, when the adhesion suppressing layers 16 and 18 are disposed on both surfaces of the substrate 11, the adhesion suppressing layer 16 and the adhesion suppressing layer 18 are in contact with each other at the time of winding the laminate 10. Therefore, metal adhesion can be further suppressed as compared with the case where the first reinforcing layer 12 and the adhesion suppressing layer 16 are in contact with each other as in the first embodiment.

In a case where the tensile stresses (internal stresses) of the first and second reinforcing layers 12 and 15 are different from each other, the adhesion suppressing layer 16 on which a compressive stress as an internal stress acts may be disposed on a reinforcing layer having a higher tensile stress out of the first and second reinforcing layers 12 and 15. This is because a tensile stress that cannot be canceled out due to the difference in tensile stress between the first and second reinforcing layers 12 and 15 can be canceled out by the compressive stress of the adhesion suppressing layer 16.

In the above-described first embodiment, the case where the magnetic recording medium is a perpendicular magnetic recording medium has been described as an example, but the magnetic recording medium may be a horizontal magnetic recording medium.

In the above-described first embodiment, the example in which the hexagonal ferrite magnetic powder or the cubic ferrite magnetic powder is used as the magnetic powder contained in the recording layer 14 has been described. However, the magnetic powder is not limited to this example, and a magnetic powder generally used in the perpendicular magnetic recording medium or the horizontal magnetic recording medium can be used. Specific examples of the magnetic powder include a Fe-based metal powder, a Fe—Co-based metal powder, iron carbide, iron oxide, and the like. Note that as an auxiliary element, a metal compound of Co, Ni, Cr, Mn, Mg, Ca, Ba, Sr, Zn, Ti, Mo, Ag, Cu, Na, K, Li, Al, Si, Ge, Ga, Y, Nd, La, Ce, Zr, or the like may coexist.

In the above-described first embodiment, the example in which the base layer 13 and the recording layer 14 are thin films manufactured by a coating step (wet process) has been described. However, the base layer 13 and the recording layer 14 may be thin films manufactured by a vacuum thin film manufacturing technique (dry process) such as sputtering.

In the above-described first embodiment, the case where the magnetic recording medium includes the base layer and the back layer has been described as an example, but it may also be possible that the magnetic recording medium does not include at least one of the base layer or the back layer.

2 Second Embodiment

[2.1 Configuration of Display]

Figure 3A:
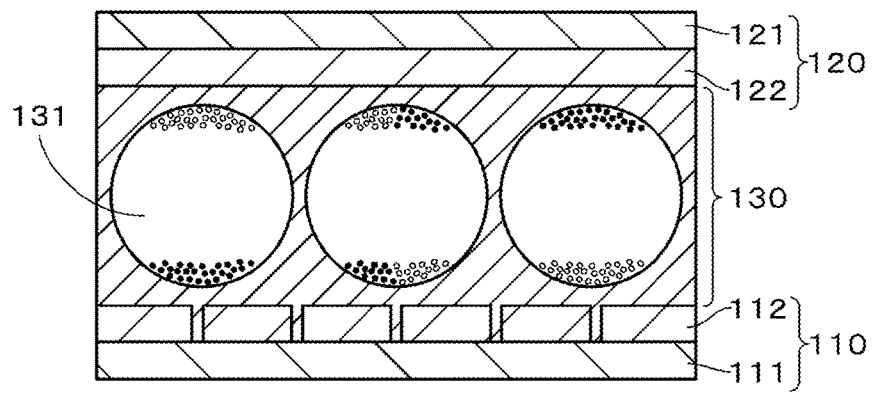
FIG. 3A is a schematic cross-sectional view illustrating an example of a configuration of a display according to a second embodiment of the present technology.

A display according to a second embodiment of the present technology is a flexible microcapsule electrophoretic type electronic paper, and as illustrated in FIG. 3A, includes a first conductive element 110, a second conductive element 120 disposed so as to face the first conductive element 110, and a microcapsule layer (medium layer) 130 disposed between these elements. This display is an example of a flexible device. Here, an example in which the present technology is applied to the microcapsule electrophoretic type electronic paper will be described. However, the electronic paper is not limited to this example. The present technology can also be applied to an electronic paper of a twist ball type, a thermal rewritable type, a toner display type, an in-plane electrophoretic type, an electronic powder type, or the like. Furthermore, the present technology can also be applied to a liquid crystal display, an organic electro luminescence (EL) display, and the like.

(Microcapsule Layer)

The microcapsule layer 130 includes a plurality of microcapsules 131. In each of the microcapsules 131, for example, a transparent liquid (dispersion medium) in which black particles and white particles are dispersed is enclosed.

(First and Second Conductive Elements)

The first conductive element 110 includes a laminate 111 and an electrode 112 disposed on one surface of the laminate 111. The second conductive element 120 includes a laminate 121 and an electrode 122 disposed on one surface of the laminate 121. The first and second conductive elements 110 and 120 are disposed so as to be separated from each other by a predetermined distance such that the electrodes 112 and 122 face each other.

The electrodes 112 and 122 are each formed in a predetermined electrode pattern shape according to a driving method of the display. Examples of the driving method include a simple matrix driving method, an active matrix driving method, a segment driving method, and the like.

Figure 3B:
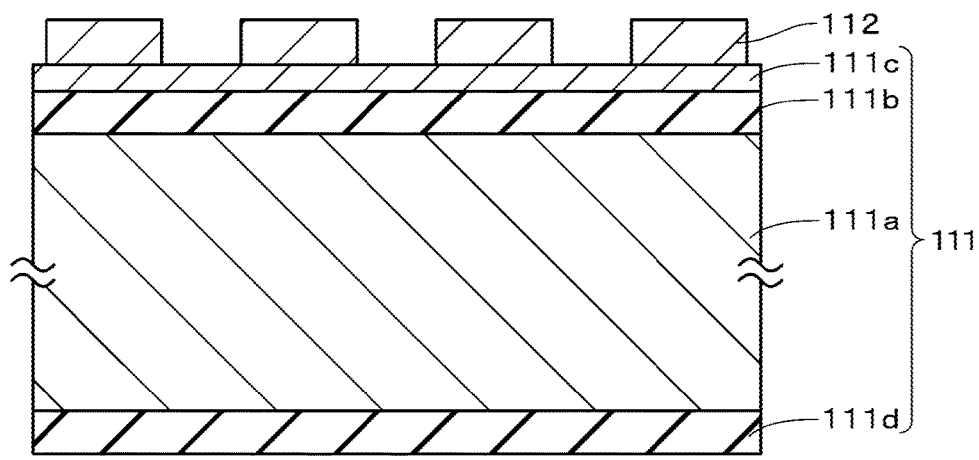
FIG. 3B is an enlarged cross-sectional view of a part of FIG. 3A.

As illustrated in FIG. 3B, the laminate 111 includes a substrate 111a, a first reinforcing layer 111b disposed on one surface of the substrate 111a, an adhesion suppressing layer 111c disposed on the first reinforcing layer 111b, and a second reinforcing layer 111d disposed on the other surface of the substrate 111a. The substrate 111a, the first reinforcing layer 111b, the adhesion suppressing layer 111c, and the second reinforcing layer 111d may be transparent or opaque to visible light.

The substrate 111a has a film shape. Here, the film also includes a sheet. The substrate 111a has a thickness of 10 μm or less, for example. For a material of the substrate 111a, for example, a polymer resin can be used. As the polymer resin, for example, at least one of polyethylene terephthalate (PET), polyethylene naphthalate (PEN), polycarbonate (PC), an acrylic resin (PMMA), polyimide (PI), triacetylcellulose (TAC), polyester, polyamide (PA), aramid, polyethylene (PE), polyacrylate, polyether sulfone, polysulfone, polypropylene (PP), diacetyl cellulose, polyvinyl chloride, an epoxy resin, a urea resin, a urethane resin, a melamine resin, a cyclic olefin polymer (COP), and a norbornene-based thermoplastic resin can be used.

The first and second reinforcing layers 111b and 111d are similar to the first and second reinforcing layers 12 and 15 in the first embodiment, respectively.

The adhesion suppressing layer 111c is different from the adhesion suppressing layer 16 in the first embodiment in that being limited to an insulating layer.

The first conductive element 110 on a side on which the second reinforcing layer 111d is disposed preferably has surface resistance of 0.4Ω/□ or less. Here, the surface resistance is a value measured by a four-terminal method.

The laminate 111 preferably has a humidity expansion coefficient of 0 ppm/% RH or more and 4.8 ppm/% RH or less. When the humidity expansion coefficient is within the above range, dimensional stability of the first conductive element 110 can be further improved.

The laminate 121 has a similar configuration to the laminate 111, and therefore description thereof will be omitted. However, as the substrate, the first reinforcing layer, the adhesion suppressing layer, the insulating layer, and the second reinforcing layer included in the laminate 121, those having transparency to visible light are used.

[2.2 Effect]

The display according to the second embodiment includes the first and second conductive elements 110 and 120 disposed such that the electrodes 112 and 122 face each other. The first conductive element 110 includes the first reinforcing layer 111b disposed on one surface of the substrate 111a, the adhesion suppressing layer 111c disposed on the first reinforcing layer 111b, and the second reinforcing layer 111d disposed on the other surface of the substrate 111a. As a result, the substrate 111a can be strengthened by the first and second reinforcing layers 111b and 111d, and internal stresses (tensile stresses) of the first and second reinforcing layers 111b and 111d can canceled out each other. As a result, the first conductive element 110 having excellent dimensional stability and capable of suppressing curvature is obtained. Therefore, shape stability of the first conductive element 110 can be improved. The second conductive element 120 also has a similar configuration to the first conductive element 110, and therefore shape stability of the second conductive element 120 can also be improved.

As described above, shape stability of the first and second conductive elements 110 and 120 can be improved. Therefore, even in a case where the electrodes 112 and 122 are highly integrated, deterioration of overlapping accuracy between patterns of the electrodes 112 and 122 can be suppressed. As a result, it is possible to provide a high-quality display.

Furthermore, in a step of manufacturing the display, when the laminate 111 is wound into a roll, the adhesion suppressing layer 111c is interposed between the first and second reinforcing layers 111b and 111d. Therefore, adhesion between the first and second reinforcing layers 111b and 111d can be suppressed. The second conductive element 120 also has a similar configuration to the first conductive element 110, and therefore adhesion between the first and second reinforcing layers can also be suppressed.

[2.3 Modification Example]

In the above-described second embodiment, the example in which the present technology is applied to the display and the first and second conductive elements 110 and 120 included in the display has been described, but the present technology is not limited thereto. The present technology is also applicable, for example, to an electromagnetic shield, a touch panel, and various wearable devices. In a case where the present technology is applied to a touch panel or a wearable device, for example, deterioration of overlapping accuracy between highly integrated electrode patterns or between wiring patterns can be suppressed.

In the above-described second embodiment, the example in which the present technology is applied to the flexible device (flexible display) has been described, but the present technology can also be applied to a non-flexible device.

Figure 4A:
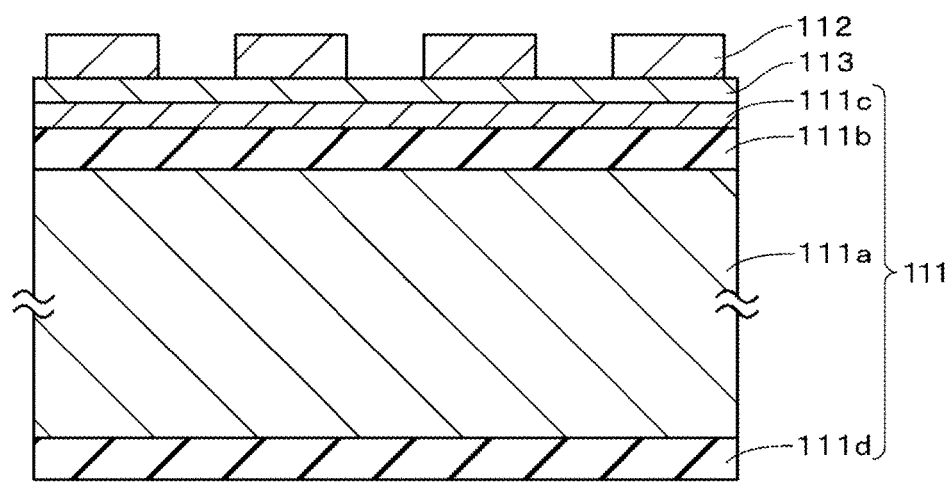
FIGS. 4A and 4B are each a cross-sectional view illustrating a modification example of a laminate.

In a case where the adhesion suppressing layer 111c is conductive, as illustrated in FIG. 4A, it is only required to dispose an insulating layer 113 between the laminate 111 and the electrode 112.

As a material of the insulating layer 113, either an inorganic material or an organic material may be used. Examples of the inorganic material include $SiO_2$, SiNx, SiON, $Al_2O_3$, $Ta_2O_5$, $Y_2O_3$, $HfO_2$, HfAlO, $ZrO_2$, $TiO_2$, and the like. Examples of the organic material include a polymer resin such as a polyacrylate including polymethyl methacrylate (PMMA), polyvinyl alcohol (PVA), polystyrene (PS), transparent polyimide, polyester, epoxy, polyvinyl phenol, polyvinyl alcohol, or the like.

Figure 4B:
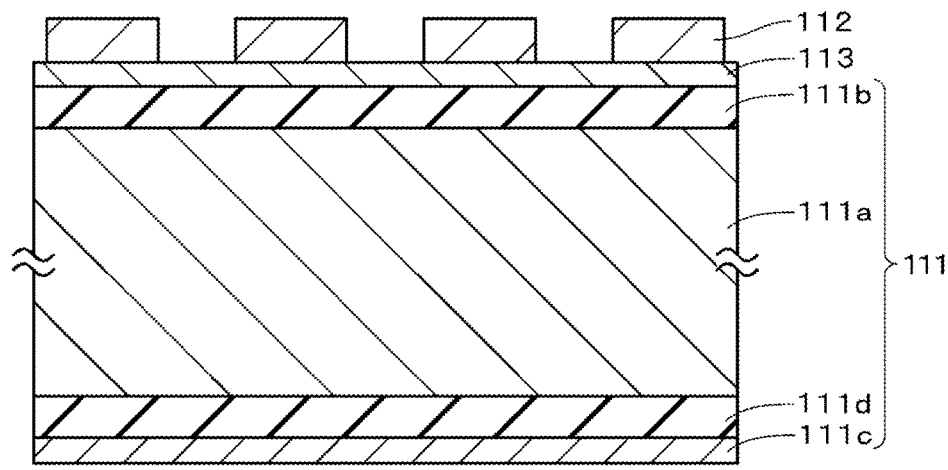

Instead of including the adhesion suppressing layer 111c on the first reinforcing layer 111b, as illustrated in FIG. 4B, the laminate 111 may include the adhesion suppressing layer 111c on the second reinforcing layer 111d. In this case, the insulating layer 113 is disposed between the first reinforcing layer 111b and the electrode 112.

In a case where the average thicknesses of the first and second reinforcing layers 111b and 111d are different from each other, the adhesion suppressing layer 111c may be disposed on a reinforcing layer having a larger average thickness out of the first and second reinforcing layers 111b and 111d. This is because an internal stress (tensile stresses) that cannot be canceled out due to the difference in average thickness between the first and second reinforcing layers 111b and 111d can be canceled out by the internal stress (compressive stress) of the adhesion suppressing layer 111c.

3. Third Embodiment

[3.1 Configuration of Magnetic Recording Medium]

Figure 6:
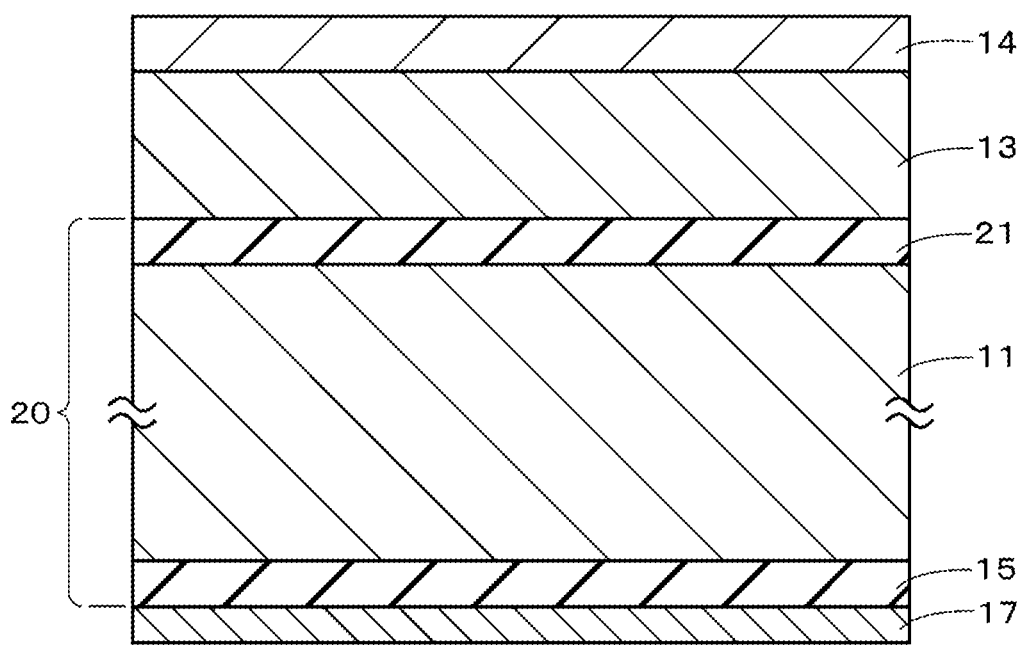
FIG. 6 is a schematic cross-sectional view illustrating an example of a configuration of a magnetic recording medium according to a third embodiment of the present technology.

As illustrated in FIG. 6, a magnetic recording medium according to a third embodiment of the present technology includes an elongated substrate 11, a first reinforcing layer 21 disposed on one surface of the substrate 11, a base layer 13 disposed on the first reinforcing layer 21, a recording layer 14 disposed on the base layer 13, a second reinforcing layer 15 disposed on the other surface of the substrate 11, and a back layer 17 disposed on the second reinforcing layer 15. The substrate 11, the first reinforcing layer 21, and the second reinforcing layer 15 constitute a laminate 20. Note that in the third embodiment, the same signs are given to portions similar to the first embodiment, and description thereof will be omitted.

The first reinforcing layer 21 contains a metal and oxygen and has a concentration distribution in which an oxygen concentration changes in a thickness direction thereof. The oxygen concentration on a surface on the base layer 13 side (that is, a surface on the opposite side to the substrate 11 side) out of both surfaces of the first reinforcing layer 21 is higher than the oxygen concentration inside the first reinforcing layer 21. The oxygen concentration of the first reinforcing layer 21 may decrease from the surface on the base layer 13 side toward the inside. In this case, a change in oxygen concentration may be continuous or discontinuous.

The oxygen concentration on a surface on the substrate 11 side out of both surfaces of the first reinforcing layer 21 may be higher than the oxygen concentration inside the first reinforcing layer 21. This is because in a case where the first reinforcing layer 21 is formed using a vacuum thin film manufacturing technique such as a vapor deposition method or sputtering, depending on a material, a surface state, and the like of the substrate 11, as described above, the oxygen concentration on a surface on the substrate 11 side out of both surfaces of the first reinforcing layer 21 may be higher than the oxygen concentration inside the first reinforcing layer 21. Note that the oxygen concentration of the first reinforcing layer 21 may decrease from the surface on the base material 11 side toward the inside.

The metal contained in the first reinforcing layer 21 is similar to the metal contained in the first reinforcing layer 12 in the first embodiment.

The first reinforcing layer 21 having the above concentration distribution can be manufactured, for example, by changing an oxygen concentration contained in a process gas when the first reinforcing layer 21 is formed using a vacuum thin film manufacturing technique such as a vapor deposition method or sputtering.

[3.2 Effect]

In the magnetic recording medium according to the first embodiment of the present technology, the first reinforcing layer 21 contains a metal and oxygen and has a concentration distribution in which the oxygen concentration changes in a thickness direction thereof. The oxygen concentration on a surface on the base layer 13 side out of both surfaces of the first reinforcing layer 21 is higher than the oxygen concentration inside the first reinforcing layer 21. As a result, in a step of manufacturing the magnetic recording medium, when the laminate 20 is wound into a roll, the first and second reinforcing layers 21 and 15 are brought into contact with each other via a surface of the first reinforcing layer 21 containing a metal and oxygen. Therefore, metal adhesion between the first and second reinforcing layers 21 and 15 can be suppressed.

[3.3 Modification Example]

The magnetic recording medium may include the second reinforcing layer 15 containing a metal and oxygen and having a concentration distribution in which the oxygen concentration changes in a thickness direction thereof. In this case, the oxygen concentration on a surface on the back layer 17 side (that is, a surface on the opposite side to the substrate 11 side) out of both surfaces of the second reinforcing layer 15 is higher than the oxygen concentration inside the second reinforcing layer 15. The oxygen concentration of the second reinforcing layer 15 may decrease from the surface on the back layer 17 side toward the inside. The oxygen concentration on a surface on the substrate 11 side out of both surfaces of the second reinforcing layer 15 may be higher than the oxygen concentration inside the second reinforcing layer 15. In a case of adopting the above configuration, the first and second reinforcing layers 21 and 15 on both surfaces of the substrate 11 have the same or substantially the same configuration as each other. Therefore, cupping can be further suppressed. As a result, the magnetic recording medium can be further stabilized and be smoother. Furthermore, the first and second reinforcing layers 21 and 15 are in contact with each other via the surfaces of the first and second reinforcing layers 21 and 15 each containing a metal and oxygen. Therefore, metal adhesion between the first and second reinforcing layers 21 and 15 can be further suppressed.

In a case where the magnetic recording medium includes the second reinforcing layer 15 having the above configuration, the magnetic recording medium may include the first reinforcing layer 12 in the first embodiment instead of the first reinforcing layer 21.

The display according to the second embodiment may include the laminate 20 in the third embodiment instead of the laminate 111.

EXAMPLES

Hereinafter, the present technology will be specifically described with reference to Examples, but the present technology is not limited only to these Examples.

Note that in the following Examples and Comparative Examples, an average thickness of each of first and second reinforcing layers and an adhesion suppressing layer was determined in a similar manner to the method described in the first embodiment.

The present Examples will be described in the following order.
i Examples and Comparative Examples for magnetic tape
ii Examples and Comparative Examples for electromagnetic shield i Examples and Comparative Examples for Magnetic Tape Examples 1 to 16

(Step of Preparing Recording Layer-Forming Coating Material)

First, a recording layer-forming coating material was prepared as follows. First, the following raw materials were kneaded with an extruder to obtain a kneaded product.
CoNi ferrite crystal magnetic powder: 100 parts by mass
(Shape: substantially cubic shape, average plate diameter: 11 nm, average plate ratio: 0.95)
Vinyl chloride-based resin (cyclohexanone solution 30% by mass): 55.6 parts by mass
(Degree of polymerization: 300, Mn=10000, $OSO_3K$=0.07 mmol/g and secondary OH=0.3 mmol/g were contained as polar groups)
Aluminum oxide powder: 5 parts by mass
($\alpha$-$Al_2O_3$, average particle diameter: 0.2 μm)
Carbon black: 2 parts by mass
(Manufactured by Tokai Carbon Co., Ltd., trade name: Seast TA)

Next, the kneaded product and the following raw materials were put in a stirring tank equipped with a disper, and were premixed. Thereafter, the mixture was further subjected to sand mill mixing, and was subjected to a filter treatment to prepare a recording layer-forming coating material.
Vinyl chloride-based resin: 27.8 parts by mass
(Resin solution: resin content 30% by mass, cyclohexanone 70% by mass)
Polyisocyanate: 4 parts by mass
(Trade name: Coronate L, manufactured by Nippon Polyurethane Industry Co., Ltd.)
Myristic acid: 2 parts by mass
n-Butyl stearate: 2 parts by mass
Methyl ethyl ketone: 121.3 parts by mass
Toluene: 121.3 parts by mass
Cyclohexanone: 60.7 parts by mass (Step of Preparing Base Layer-Forming Coating Material)

Next, a base layer-forming coating material was prepared as follows. First, the following raw materials were kneaded with an extruder to obtain a kneaded product.
Acicular iron oxide powder: 100 parts by mass
($\alpha$-$Fe_2O_3$, average long axis length 0.15 μm)
Vinyl chloride-based resin: 55.6 parts by mass
(Resin solution: resin content 30% by mass, cyclohexanone 70% by mass)
Carbon black: 10 parts by mass
(Average particle diameter 20 nm)

Next, the kneaded product and the following raw materials were put in a stirring tank equipped with a disper, and were premixed. Thereafter, the mixture was further subjected to sand mill mixing, and was subjected to a filter treatment to prepare a base layer-forming coating material.
Polyurethane-based resin UR8200 (manufactured by Toyobo Co., Ltd.): 18.5 parts by mass
Polyisocyanate: 4 parts by mass
(Trade name: Coronate L, manufactured by Nippon Polyurethane Industry Co., Ltd.)
Myristic acid: 2 parts by mass
n-Butyl stearate: 2 parts by mass
Methyl ethyl ketone: 108.2 parts by mass
Toluene: 108.2 parts by mass
Cyclohexanone: 18.5 parts by mass (Step of Preparing Back Layer-Forming Coating Material)

Next, a backing layer-forming coating material was prepared as follows. The following raw materials were mixed in a stirring tank equipped with a disper, and were subjected to a filter treatment to prepare a back layer-forming coating material.
Carbon black (manufactured by Asahi Corporation, trade name: #80): 100 parts by mass
Polyester polyurethane: 100 parts by mass
(Trade name: N-2304, manufactured by Nippon Polyurethane Industry Co., Ltd.)
Methyl ethyl ketone: 500 parts by mass Toluene: 400 parts by mass
Cyclohexanone: 100 parts by mass (Step of Forming First Reinforcing Layer)

Next, a Cu layer (first reinforcing layer) was formed on one surface of a belt-shaped PEN film (substrate) having a thickness of 6.2 µm using a roll-to-roll type vacuum vapor deposition apparatus. At this time, as illustrated in Table 1, an average thickness of the Cu layer was set by adjusting film formation conditions such as film winding speed.

(Step of Forming Second Reinforcing Layer)

Next, a Cu layer (second reinforcing layer) was formed on the other surface of the PEN film using a roll-to-roll type vacuum vapor deposition apparatus. At this time, as illustrated in Table 1, an average thickness of the Cu layer was set by adjusting film formation conditions such as film winding speed.

(Step of Forming Adhesion Suppressing Layer)

Next, a DLC layer (adhesion suppressing layer) was formed on the Cu layer as the second reinforcing layer using a roll-to-roll type CVD apparatus. At this time, the average thickness of the DLC layer was set as illustrated in Table 1 by adjusting film forming conditions such as a film winding speed, a flow rate of an introduced gas, and a discharge voltage. In this way, a laminate was obtained. Then, the obtained laminate was wound into a roll. At this time, metal adhesion between the first and second reinforcing layers was suppressed by the DLC layer (adhesion suppressing layer). Therefore, sticking between the first and second reinforcing layers did not occur. Note that sticking between the first and second reinforcing layers due to metal adhesion did not occur because the adhesion suppressing layer was similarly disposed in Examples 17 to 25 described below.

(Step of Forming Base Layer)

Next, a base layer-forming coating material was applied onto the Cu layer as the first reinforcing layer and dried to form a base layer having a thickness of 1 µm on the Cu layer.

(Step of Forming Recording Layer)

Next, by applying a recording layer-forming coating material onto the base layer and drying the recording layer-forming coating material, a recording layer having a thickness of 70 nm was formed on the base layer.

(Step of Forming Back Layer)

Next, wettability of the surface of the DLC layer was improved by surface modification. Thereafter, a back layer-forming coating material was applied onto the DLC layer and dried to form a back layer having a thickness of 0.6 µm on the DLC layer. As a result, a wide magnetic tape was obtained.

(Step of Calendering Treatment and Cutting)

Next, a magnetic tape was calendered with a metal roll to smoothen a surface of the recording layer. Next, the wide magnetic tape was cut into a width of ½ inches (12.65 mm) to obtain a target magnetic tape.

Example 17

A magnetic tape was obtained in a similar manner to Example 7 except that an Al layer was formed instead of the Cu layer as each of the first and second reinforcing layers.

Example 18

A magnetic tape was obtained in a similar manner to Example 17 except that a Co layer was formed instead of the Cu layer as each of the first and second reinforcing layers.

Example 19

A magnetic tape was obtained in a similar manner to Example 18 except that the film forming conditions of the first and second reinforcing layers were adjusted such that the average thicknesses of the first and second reinforcing layers were the values illustrated in Table 3.

Example 20

A magnetic tape was obtained in a similar manner to Example 17 except that a Co layer was formed instead of the Al layer as the second reinforcing layer.

Example 21

A magnetic tape was obtained in a similar manner to Example 8 except that a CoO layer was formed instead of the DLC layer as the adhesion suppressing layer.

Example 22

A magnetic tape was obtained in a similar manner to Example 8 except that an $Al_2O_3$ layer was formed instead of the DLC layer as the adhesion suppressing layer.

Examples 23 to 25

A magnetic tape was obtained in a similar manner to Examples 8, 21, and 22 except that the DLC layer was formed on the Cu layer as the first reinforcing layer instead of forming the DLC layer on the Cu layer as the second reinforcing layer.

Example 26

A magnetic tape was obtained in a similar manner to Example 19 except that a CoO layer having an average thickness of 10 nm was formed on a Co layer on the back layer side as a first adhesion suppressing layer and a CoO layer having an average thickness of 10 nm was formed on the Co layer on the recording layer side as a second adhesion suppressing layer instead of forming the DLC layer having an average thickness of 5 nm on the Co layer on the back layer side as the adhesion suppressing layer.

Example 27

A magnetic tape was obtained in a similar manner to Example 26 except that the average thickness of each of the first and second reinforcing layers was 50 nm and the average thickness of each of the first and second adhesion suppressing layers was 100 nm.

Example 28

A magnetic tape was obtained in a similar manner to Example 27 except that a Cu layer having an average thickness of 50 nm was formed instead of the Co layer having an average thickness of 50 nm as each of the first and second reinforcing layers and a CuO layer having an average thickness of 200 nm was formed instead of the CoO layer having an average thickness of 100 nm as each of the first and second adhesion suppressing layers.

Example 29

A magnetic tape was obtained in a similar manner to Example 27 except that an Al layer having an average thickness of 50 nm was formed instead of the Co layer having an average thickness of 50 nm as each of the first and second reinforcing layers and an $Al_2O_3$ layer having an average thickness of 250 nm was formed instead of the CoO layer having an average thickness of 100 nm as each of the first and second adhesion suppressing layers.

Example 30

A magnetic tape was obtained in a similar manner to Example 27 except that a $Co_2O_3$ layer having an average thickness of 150 nm was formed instead of the CoO layer having an average thickness of 100 nm as each of the first and second adhesion suppressing layers.

Comparative Examples 1 to 4

A laminate was obtained in a similar manner to Example 1 except that formation of the adhesion suppressing layer was omitted and the film forming conditions of the first and second reinforcing layers were adjusted such that the average thicknesses of the first and second reinforcing layers were the values illustrated in Table 3. Note that the first and second reinforcing layers were stuck to each other by metal adhesion at the stage of winding the obtained laminate into a roll, and therefore a magnetic tape could not be manufactured.

Comparative Examples 5 and 6

A laminate was obtained in a similar manner to Examples 17 and 18 except that formation of the adhesion suppressing layer was omitted. Note that the first and second reinforcing layers were stuck to each other by metal adhesion at the stage of winding the obtained laminate into a roll, and therefore a magnetic tape could not be manufactured.

Comparative Examples 7 and 8

A magnetic tape was obtained in a similar manner to Example 1 except that formation of the second reinforcing layer and the adhesion suppressing layer was omitted and the film forming conditions of the first reinforcing layer were adjusted such that the average thickness of the first reinforcing layer was the value illustrated in Table 3.

Comparative Examples 9 and 10

A magnetic tape was obtained in a similar manner to Example 1 except that formation of the second reinforcing layer was omitted and the film forming conditions of the first reinforcing layer and the adhesion suppressing layer were adjusted such that the average thicknesses of the first reinforcing layer and the adhesion suppressing layer were the values illustrated in Table 3.

[Evaluation]

The magnetic tapes in Examples 1 to 30 and Comparative Examples 7 to 10 obtained as described above were evaluated as follows. Note that the magnetic tapes in Comparative Examples 7 to 10 were evaluated only for cupping.

(Cupping)

Using a cupping measuring apparatus, a tape of 1 m after slitting was allowed to stand for 24 hours in an environment of a temperature of 23° C. and a relative humidity of 60%, and then the amount of cupping was measured. With the recording layer facing upward, the amount of cupping was measured by regarding cupping where the recording layer side was protruding as minus (−) and regarding cupping where the back layer side was protruding as plus (+), and judgement was performed according to the following criteria.

○: The amount of cupping is within a range of 0.0 to −0.5 mm

Δ: The amount of cupping is within a range of −0.5 to −1.5 mm x: The amount of cupping is outside a range of 0.0 to −1.5 mm Note that the length of a measurement sample was 1±0.1 m.

(Humidity Expansion Coefficient)

First, in a case where a thermostatic chamber was changed from environmental condition 1 (temperature 16° C., relative humidity 10%) to environmental condition 2 (temperature 29° C., relative humidity 80%), a dimensional change was measured using a laser displacement meter LS-7000 manufactured by Keyence Corporation. Next, a humidity expansion coefficient was determined by the following formula.

$TDS$ (humidity) [ppm]=((tape width at temperature of 29° C. and relative humidity of 80%)−(tape width at temperature of 16° C. and relative humidity of 10%))/(tape width at temperature of 16° C. and relative humidity of 10%)

Humidity expansion coefficient [ppm/% $RH$]=$TDS$ (humidity)/(80−10)

(SNR)

First, SNR was determined by causing a magnetic tape to travel in a commercially available tape traveling system manufactured by Mountain Engineering Co., Ltd., and performing record and reproduction using a magnetic head of a ½ inch fixed head type drive. Next, the determined SNR was judged according to the following criteria.

○: SNR is within −1.5 dB with respect to a reference tape (MSRT) of LTO5 media

Δ: SNR is more than −1.5 dB and −2.5 dB or less with respect to a reference tape (MSRT) of LTO5 media x: SNR is more than −2.5 dB with respect to a reference tape (MSRT) of LTO5 media (Result)

Tables 1 and 2 illustrate the configurations and evaluation results of magnetic tapes in Examples 1 to 16.

TABLE 1

| | First reinforcing layer (recording layer side) | | Second reinforcing layer (back layer side) | | | Adhesion suppressing layer (recording layer side) | | Adhesion suppressing layer (back layer side) | |
|---|---|---|---|---|---|---|---|---|---|
| | Material | Average thickness D1 (nm) | Material | Average thickness D2 (nm) | Total thickness D1 + D2 (nm) | Material | Average thickness D3 (nm) | Material | Average thickness D4 (nm) |
| Example 1 | Cu | 75 | Cu | 75 | 150 | — | — | DLC | 30 |
| Example 2 | Cu | 250 | Cu | 250 | 500 | — | — | DLC | 50 |
| Example 3 | Cu | 75 | Cu | 75 | 150 | — | — | DLC | 10 |

TABLE 1-continued

|  | First reinforcing layer (recording layer side) | | Second reinforcing layer (back layer side) | | | Adhesion suppressing layer (recording layer side) | | Adhesion suppressing layer (back layer side) | |
| --- | --- | --- | --- | --- | --- | --- | --- | --- | --- |
|  | Material | Average thickness D1 (nm) | Material | Average thickness D2 (nm) | Total thickness D1 + D2 (nm) | Material | Average thickness D3 (nm) | Material | Average thickness D4 (nm) |
| Example 4 | Cu | 100 | Cu | 100 | 200 | — | — | DLC | 10 |
| Example 5 | Cu | 150 | Cu | 150 | 300 | — | — | DLC | 10 |
| Example 6 | Cu | 200 | Cu | 200 | 400 | — | — | DLC | 3 |
| Example 7 | Cu | 200 | Cu | 200 | 400 | — | — | DLC | 5 |
| Example 8 | Cu | 200 | Cu | 200 | 400 | — | — | DLC | 10 |
| Example 9 | Cu | 200 | Cu | 200 | 400 | — | — | DLC | 20 |
| Example 10 | Cu | 200 | Cu | 200 | 400 | — | — | DLC | 50 |
| Example 11 | Cu | 300 | Cu | 300 | 600 | — | — | DLC | 1 |
| Example 12 | Cu | 300 | Cu | 300 | 600 | — | — | DLC | 2 |
| Example 13 | Cu | 300 | Cu | 300 | 600 | — | — | DLC | 3 |
| Example 14 | Cu | 300 | Cu | 300 | 600 | — | — | DLC | 100 |
| Example 15 | Cu | 150 | Cu | 250 | 400 | — | — | DLC | 10 |
| Example 16 | Cu | 100 | Cu | 300 | 400 | — | — | DLC | 10 |

TABLE 2

|  | Ratio of average thickness D3/D1 | Ratio of average thickness D4/D2 | Evaluation | | | |
| --- | --- | --- | --- | --- | --- | --- |
|  |  |  | Metal adhesion | Cupping | Humidity expansion coefficient (ppm/RH %) | SNR (190kFCI) |
| Example 1 | — | 0.400 | Not occurred | Δ | 5 | Δ |
| Example 2 | — | 0.200 | Not occurred | ○ | 3.1 | ○ |
| Example 3 | — | 0.133 | Not occurred | ○ | 5.2 | ○ |
| Example 4 | — | 0.100 | Not occurred | ○ | 4.6 | ○ |
| Example 5 | — | 0.067 | Not occurred | ○ | 4.1 | ○ |
| Example 6 | — | 0.015 | Not occurred | ○ | 3.5 | ○ |
| Example 7 | — | 0.025 | Not occurred | ○ | 3.2 | ○ |
| Example 8 | — | 0.050 | Not occurred | ○ | 3.1 | ○ |
| Example 9 | — | 0.100 | Not occurred | ○ | 3.1 | ○ |
| Example 10 | — | 0.250 | Not occurred | ○ | 3 | ○ |
| Example 11 | — | 0.003 | Not occurred | ○ | 3 | ○ |
| Example 12 | — | 0.007 | Not occurred | ○ | 3 | ○ |
| Example 13 | — | 0.010 | Not occurred | ○ | 2.3 | ○ |
| Example 14 | — | 0.333 | Not occurred | ○ | 2.8 | ○ |
| Example 15 | — | 0.067 | Not occurred | ○ | 3.2 | ○ |
| Example 16 | — | 0.100 | Not occurred | ○ | 3.1 | ○ |

Tables 3 and 4 illustrate the configurations and evaluation results of magnetic tapes in Examples 17 to 25 and Comparative Examples 1 to 10.

TABLE 3

|  | First reinforcing layer (recording layer side) | | Second reinforcing layer (back layer side) | | Total thickness D1 + D2 (nm) | Adhesion suppressing layer (recording layer side) | | Adhesion suppressing layer (back layer side) | |
|---|---|---|---|---|---|---|---|---|---|
|  | Material | Average thickness D1 (nm) | Material | Average thickness D2 (nm) |  | Material | Average thickness D3 (nm) | Material | Average thickness D4 (nm) |
| Example 17 | Al | 200 | Al | 200 | 400 | — | — | DLC | 5 |
| Example 18 | Co | 200 | Co | 200 | 400 | — | — | DLC | 5 |
| Example 19 | Co | 150 | Co | 150 | 300 | — | — | DLC | 5 |
| Example 20 | Al | 200 | Co | 200 | 400 | — | — | DLC | 5 |
| Example 21 | Cu | 200 | Cu | 200 | 400 | — | — | CoO | 10 |
| Example 22 | Cu | 200 | Cu | 200 | 400 | — | — | $Al_2O_3$ | 10 |
| Example 23 | Cu | 200 | Cu | 200 | 400 | DLC | 10 | — | — |
| Example 24 | Cu | 200 | Cu | 200 | 400 | CoO | 10 | — | — |
| Example 25 | Cu | 200 | Cu | 200 | 400 | $Al_2O_3$ | 10 | — | — |
| Comparative Example 1 | Cu | 75 | Cu | 75 | 150 | — | — | — | — |
| Comparative Example 2 | Cu | 100 | Cu | 100 | 200 | — | — | — | — |
| Comparative Example 3 | Cu | 150 | Cu | 150 | 300 | — | — | — | — |
| Comparative Example 4 | Cu | 300 | Cu | 300 | 600 | — | — | — | — |
| Comparative Example 5 | Al | 200 | Al | 200 | 400 | — | — | — | — |
| Comparative Example 6 | Co | 200 | Co | 200 | 400 | — | — | — | — |
| Comparative Example 7 | Cu | 150 | — | — | 150 | — | — | — | — |
| Comparative Example 8 | Cu | 300 | — | — | 300 | — | — | — | — |
| Comparative Example 9 | Cu | 150 | — | — | 150 | — | — | DLC | 5 |
| Comparative Example 10 | Cu | 300 | — | — | 300 | — | — | DLC | 5 |

TABLE 4

|  | Ratio of average thickness D3/D1 | Ratio of average thickness D4/D2 | Evaluation | | | |
|---|---|---|---|---|---|---|
|  |  |  | Metal adhesion | Cupping | Humidity expansion coefficient (ppm/RH %) | SNR (190kFCI) |
| Example 17 | — | 0.050 | Not occurred | ○ | 4 | ○ |
| Example 18 | — | 0.050 | Not occurred | ○ | 4.2 | ○ |
| Example 19 | — | 0.033 | Not occurred | ○ | 4.5 | ○ |
| Example 20 | — | 0.025 | Not occurred | ○ | 4.1 | ○ |
| Example 21 | — | 0.050 | Not occurred | ○ | 3.2 | ○ |
| Example 22 | — | 0.050 | Not occurred | ○ | 3.2 | ○ |
| Example 23 | 0.050 | — | Not occurred | ○ | 3.1 | ○ |
| Example 24 | 0.050 | — | Not occurred | ○ | 3.2 | ○ |
| Example 25 | 0.050 | — | Not occurred | ○ | 3.2 | ○ |
| Comparative Example 1 | — | — | Occurred | — | — | — |
| Comparative Example 2 | — | — | Occurred | — | — | — |

TABLE 4-continued

|  | Ratio of average thickness D3/D1 | Ratio of average thickness D4/D2 | Metal adhesion | Cupping | Humidity expansion coefficient (ppm/RH %) | SNR (190kFCI) |
|---|---|---|---|---|---|---|
| Comparative Example 3 | — | — | Occurred | — | — | — |
| Comparative Example 4 | — | — | Occurred | — | — | — |
| Comparative Example 5 | — | — | Occurred | — | — | — |
| Comparative Example 6 | — | — | Occurred | — | — | — |
| Comparative Example 7 | — | — | Not occurred | X | — | — |
| Comparative Example 8 | — | — | Not occurred | X | — | — |
| Comparative Example 9 | — | 0.033 | Not occurred | X | — | — |
| Comparative Example 10 | — | 0.10 | Not occurred | X | — | — |

Tables 5 and 6 illustrate the configurations and evaluation results of magnetic tapes in Examples 26 to 30.

TABLE 5

| | First reinforcing layer (recording layer side) | | Second reinforcing layer (back layer side) | | | Adhesion suppressing layer (recording layer side) | | Adhesion suppressing layer (back layer side) | |
|---|---|---|---|---|---|---|---|---|---|
| | Material | Average thickness D1 (nm) | Material | Average thickness D2 (nm) | Total thickness D1 + D2 (nm) | Material | Average thickness D3 (nm) | Material | Average thickness D4 (nm) |
| Example 26 | Co | 150 | Co | 150 | 300 | CoO | 10 | CoO | 10 |
| Example 27 | Co | 50 | Co | 50 | 100 | CoO | 100 | CoO | 100 |
| Example 28 | Cu | 50 | Cu | 50 | 100 | CuO | 200 | CuO | 200 |
| Example 29 | Al | 50 | Al | 50 | 100 | $Al_2O_3$ | 250 | $Al_2O_3$ | 250 |
| Example 30 | Co | 50 | Co | 50 | 100 | $Co_2O_3$ | 150 | $Co_2O_3$ | 150 |

TABLE 6

|  | Ratio of average thickness D3/D1 | Ratio of average thickness D4/D2 | Metal adhesion | Cupping | Humidity expansion coefficient (ppm/RH %) | SNR (190kFCI) |
|---|---|---|---|---|---|---|
| Example 26 | 0.067 | 0.067 | Not occurred | ○ | 4.3 | ○ |
| Example 27 | 2.000 | 2.000 | Not occurred | ○ | 4.1 | ○ |
| Example 28 | 4.000 | 4.000 | Not occurred | ○ | 3.1 | ○ |
| Example 29 | 5.000 | 5.000 | Not occurred | ○ | 2.4 | ○ |
| Example 30 | 3.000 | 3.000 | Not occurred | ○ | 3.8 | ○ |

Tables 1 to 4 indicate the following.

By disposing the adhesion suppressing layer on the first reinforcing layer or the second reinforcing layer, adhesion between the first and second reinforcing layers can be suppressed (see Examples 1 to 25 and Comparative Examples 1 to 6).

By disposing the first reinforcing layer on one surface of the substrate and disposing the second reinforcing layer on the other surface of the substrate, occurrence of cupping can be suppressed (see Examples 1 to 25 and Comparative Examples 7 to 10).

As a material of the adhesion suppressing layer, a metal oxide such as cobalt oxide or aluminum oxide can be used in addition to a carbon material such as DLC (see Examples 21, 22, 24, and 25).

When a ratio (D4/D2) of an average thickness D4 of the adhesion suppressing layer to an average thickness D2 of the second reinforcing layer exceeds 0.35, the average thickness D4 of the adhesion suppressing layer is too large with respect to the average thickness D2 of the second reinforcing layer. Therefore, even if the average thicknesses D1 and D2 of the first and second reinforcing layers are the same or substantially the same as each other, cupping tends to occur (see Example 1). As a result, in a case where the average thicknesses D1 and D2 of the first and second reinforcing layers are the same or substantially the same as each other, when the ratio (D4/D2) of the average thickness D4 of the adhesion suppressing layer to the average thickness D2 of the second reinforcing layer is 0.35 or less, occurrence of cupping can be suppressed.

Note that the same applies to a ratio (D3/D1) of an average thickness D3 of the adhesion suppressing layer to the average thickness D1 of the first reinforcing layer.

By disposing the first and second adhesion suppressing layers on the first and second reinforcing layers, respectively, adhesion between the first and second reinforcing layers can be suppressed (see Examples 26 to 30).

ii Examples and Comparative Examples for Electromagnetic Shielding

Example 31 and Comparative Example 11

A laminate was formed in a similar manner to Example 1 and Comparative Example 1 except that the film forming conditions of the Cu layer and the DLC layer were adjusted such that the average thicknesses of the Cu layer and the DLC layer were the values illustrated in Table 7, and the laminate was wound into a roll. As a result, a target electromagnetic shield was obtained.

[Evaluation]

The magnetic shields in Example 31 and Comparative Example 11 obtained as described above were evaluated for whether metal adhesion occurred and a humidity expansion coefficient.

(Whether Metal Adhesion Occurred)

It was confirmed whether or not metal adhesion occurred between the first reinforcing layer (Cu layer) and the second reinforcing layer (Cu layer) of the laminate wound into a roll.

(Humidity Expansion Coefficient)

A humidity expansion coefficient was determined in a similar manner to Examples 1 to 30 described above.

(Electromagnetic Wave Transmittance)

An electromagnetic wave transmittance of each of the magnetic shields was measured by an ADVANTEST method.

Table 7 illustrates the configurations and evaluation results of laminates in Example 31 and Comparative Example 11.

TABLE 7

| | First reinforcing layer | | Second reinforcing layer | | Adhesion suppressing layer | | Evaluation | | |
|---|---|---|---|---|---|---|---|---|---|
| | Material | Average thickness D1 (nm) | Material | Average thickness D2 (nm) | Material | Average thickness D3 (nm) | Metal adhesion | Humidity expansion coefficient (ppm/% RH) | Electromagnetic wave transmittance by ADVANTEST method (dB) 500 MHz |
| Example 31 | Cu | 150 | Cu | 150 | DLC | 10 nm | Not occurred | 3.4 | −40 |
| Comparative Example 11 | Cu | 150 | Cu | 150 | DLC | 0 nm | Occurred | 3.5 | −2.5 |

Table 7 indicates the following.

By disposing the adhesion suppressing layer on the first reinforcing layer or the second reinforcing layer, adhesion between the first and second reinforcing layers can be suppressed.

Hereinabove, the embodiments and Examples of the present technology have been specifically described. However, the present technology is not limited to the above-described embodiments and Examples, and various modifications based on the technical idea of the present technology are possible.

For example, the configurations, the methods, the steps, the shapes, the materials, the numerical values, and the like exemplified in the above-described embodiments and Examples are only examples, and a configuration, a method, a step, a shape, a material, a numerical value, and the like different therefrom may be used, if necessary.

Furthermore, the configurations, the methods, the steps, the shapes, the materials, the numerical values, and the like in the above-described embodiments and Examples can be combined with each other as long as not departing from the gist of the present technology.

Furthermore, the present technology can adopt the following configurations.

(1)

A magnetic recording medium including:
an elongated substrate having a first surface and a second surface;
a first reinforcing layer disposed on the first surface;
a second reinforcing layer disposed on the second surface;
an adhesion suppressing layer disposed on the second reinforcing layer; and
a recording layer disposed on the first reinforcing layer or the adhesion suppressing layer.

(2)
The magnetic recording medium according to (1), in which the second reinforcing layer has an average thickness of 75 nm or more and 300 nm or less, and a ratio of an average thickness of the adhesion suppressing layer to the second reinforcing layer is 0.005 or more and 0.35 or less.

(3)
The magnetic recording medium according to (1) or (2), in which the first reinforcing layer and the second reinforcing layer each contain at least one of a metal and a metal compound.

(4)
The magnetic recording medium according to (3), in which the metal contains at least one of aluminum, copper, cobalt, and silicon, and
the metal compound contains at least one of aluminum oxide, copper oxide, cobalt oxide, and silicon oxide.

(5)
The magnetic recording medium according to any one of (1) to (4), in which the adhesion suppressing layer contains carbon.

(6)
The magnetic recording medium according to (5), in which the carbon is diamond-like carbon.

(7)
The magnetic recording medium according to any one of (1) to (4), in which the adhesion suppressing layer contains a metal oxide.

(8)
The magnetic recording medium according to (7), in which the metal oxide contains at least one of aluminum oxide, copper oxide, and cobalt oxide.

(9)
The magnetic recording medium according to any one of (1) to (8), in which
the recording layer is disposed on the first reinforcing layer, and
the magnetic recording medium further includes:
a base layer disposed between the first reinforcing layer and the recording layer; and
a back layer disposed on the adhesion suppressing layer.

(10)
The magnetic recording medium according to any one of (1) to (8), in which
the recording layer is disposed on the adhesion suppressing layer, and
the magnetic recording medium further includes:
a base layer disposed between the adhesion suppressing layer and the recording layer; and
a back layer disposed on the first reinforcing layer.

(11)
The magnetic recording medium according to any one of (1) to (10), in which the first reinforcing layer and the second reinforcing layer have the same or substantially the same average thickness as each other.

(12)
The magnetic recording medium according to any one of (1) to (11), in which a tensile stress as an internal stress acts on the first reinforcing layer and the second reinforcing layer.

(13)
The magnetic recording medium according to (12), in which the tensile stress of the second reinforcing layer is larger than the tensile stress of the first reinforcing layer, and
a compressive stress as an internal stress acts on the adhesion suppressing layer.

(14)
The magnetic recording medium according to any one of (1) to (13), having a humidity expansion coefficient of 0 ppm/% RH or more and 4.8 ppm/% RH or less.

(15)
The magnetic recording medium according to any one of (1) to (14), in which the substrate has a thickness of 10 µm or less.

(16)
The magnetic recording medium according to any one of (1) to (15), in which the adhesion suppressing layer has an average thickness of 1 nm or more and 100 nm or less.

(17)
A magnetic recording medium including:
an elongated substrate having a first surface and a second surface;
a first reinforcing layer disposed on the first surface;
a second reinforcing layer disposed on the second surface;
a carbon thin film disposed on the second reinforcing layer; and
a recording layer disposed on the first reinforcing layer or the carbon thin film.

(18)
A magnetic recording medium including:
an elongated substrate having a first surface and a second surface;
a first reinforcing layer disposed on the first surface;
a first adhesion suppressing layer disposed on the first reinforcing layer;
a recording layer disposed on the first adhesion suppressing layer;
a second reinforcing layer disposed on the second surface; and
a second adhesion suppressing layer disposed on the second reinforcing layer.

(19)
A magnetic recording medium including:
an elongated substrate having a first surface and a second surface;
a first reinforcing layer disposed on the first surface; and
a second reinforcing layer disposed on the second surface, in which
at least one of the first reinforcing layer or the second reinforcing layer is a reinforcing layer containing a metal and oxygen, and
an oxygen concentration on a surface on the opposite side to the substrate out of both surfaces of the reinforcing layer is higher than an oxygen concentration inside the reinforcing layer.

(20)
The magnetic recording medium according to claim 19, in which the oxygen concentrations on both surfaces of the reinforcing layer are higher than the oxygen concentration inside the reinforcing layer.

(21)
A laminate including:
a substrate having a first surface and a second surface;
a first reinforcing layer disposed on the first surface;
a second reinforcing layer disposed on the second surface; and
an adhesion suppressing layer disposed on the second reinforcing layer.

(22)
A laminate including:
a substrate having a first surface and a second surface;
a first reinforcing layer disposed on the first surface;

a second reinforcing layer disposed on the second surface; and a carbon thin film disposed on the second reinforcing layer.

(23) A flexible device including the laminate according to (21) or (22).

REFERENCE SIGNS LIST 10, 111, 121 Laminate
11, 111a Substrate
12, 21, 111b First reinforcing layer
13 Base layer
14 Recording layer
15, 111d Second reinforcing layer
16, 18, 111c Adhesion suppressing layer
17 Back layer
110 First conductive element
112, 122 Electrode
120 Second conductive element
130 Microcapsule layer
131 Microcapsule

The invention claimed is:

1. A magnetic recording medium comprising:
an elongated substrate having a first surface and a second surface;
a first reinforcing layer disposed on the first surface;
a second reinforcing layer disposed on the second surface;
an adhesion suppressing layer disposed on the second reinforcing layer; and
a recording layer disposed on the first reinforcing layer or the adhesion suppressing layer,
wherein a tensile stress as an internal stress acts on the first reinforcing layer and the second reinforcing layer,
wherein the tensile stress of the second reinforcing layer is larger than the tensile stress of the first reinforcing layer, and
wherein a compressive stress as an internal stress acts on the adhesion suppressing layer.

2. The magnetic recording medium according to claim 1, wherein
the second reinforcing layer has an average thickness of 75 nm or more and 300 nm or less, and
a ratio of an average thickness of the adhesion suppressing layer to the second reinforcing layer is 0.005 or more and 0.35 or less.

3. The magnetic recording medium according to claim 1, wherein the first reinforcing layer and the second reinforcing layer each contain at least one of a metal and a metal compound.

4. The magnetic recording medium according to claim 3, wherein the metal contains at least one of aluminum, copper, and cobalt.

5. The magnetic recording medium according to claim 1, wherein the adhesion suppressing layer contains carbon.

6. The magnetic recording medium according to claim 5, wherein the carbon is diamond-like carbon.

7. The magnetic recording medium according to claim 1, wherein the adhesion suppressing layer contains a metal oxide.

8. The magnetic recording medium according to claim 7, wherein the metal oxide includes at least one of aluminum oxide, copper oxide, and cobalt oxide.

9. The magnetic recording medium according to claim 1, wherein
the recording layer is disposed on the first reinforcing layer, and
the magnetic recording medium further comprises:
a base layer disposed between the first reinforcing layer and the recording layer; and
a back layer disposed on the adhesion suppressing layer.

10. The magnetic recording medium according to claim 1, wherein
the recording layer is disposed on the adhesion suppressing layer, and
the magnetic recording medium further comprises:
a base layer disposed between the adhesion suppressing layer and the recording layer; and
a back layer disposed on the first reinforcing layer.

11. The magnetic recording medium according to claim 1, wherein the first reinforcing layer and the second reinforcing layer have a same average thickness.

12. The magnetic recording medium according to claim 1, having a humidity expansion coefficient of 0 ppm/% RH or more and 4.8 ppm/% RH or less.

13. The magnetic recording medium according to claim 1, wherein the elongated substrate has a thickness of 10 μm or less.

14. The magnetic recording medium according to claim 1, wherein the adhesion suppressing layer has an average thickness of 1 nm or more and 100 nm or less.

15. The magnetic recording medium according to claim 1, wherein the adhesion suppressing layer includes a carbon thin film.

16. The magnetic recording medium according to claim 1, wherein the adhesion suppressing layer includes a first adhesion suppressing layer and a second adhesion suppressing layer,
wherein the first adhesion suppressing layer disposed on the first reinforcing layer,
wherein the recording layer disposed on the first adhesion suppressing layer, and
wherein the second adhesion suppressing layer disposed on the second reinforcing layer.

17. A laminate comprising:
a substrate having a first surface and a second surface;
a first reinforcing layer disposed on the first surface;
a second reinforcing layer disposed on the second surface; and
an adhesion suppressing layer disposed on the second reinforcing layer,
wherein a tensile stress as an internal stress acts on the first reinforcing layer and the second reinforcing layer,
wherein the tensile stress of the second reinforcing layer is larger than the tensile stress of the first reinforcing layer, and
wherein a compressive stress as an internal stress acts on the adhesion suppressing layer.

18. The laminate according to claim 17, wherein
the adhesion suppressing layer includes a carbon thin film.

19. A flexible device comprising the laminate according to claim 17.

20. A flexible device comprising the laminate according to claim 18.

* * * * *